J. H. MacMAHON.
METHOD FOR THE PRODUCTION OF BARIUM CHLORID.
APPLICATION FILED JAN. 20, 1920.
1,378,594.
Patented May 17, 1921.
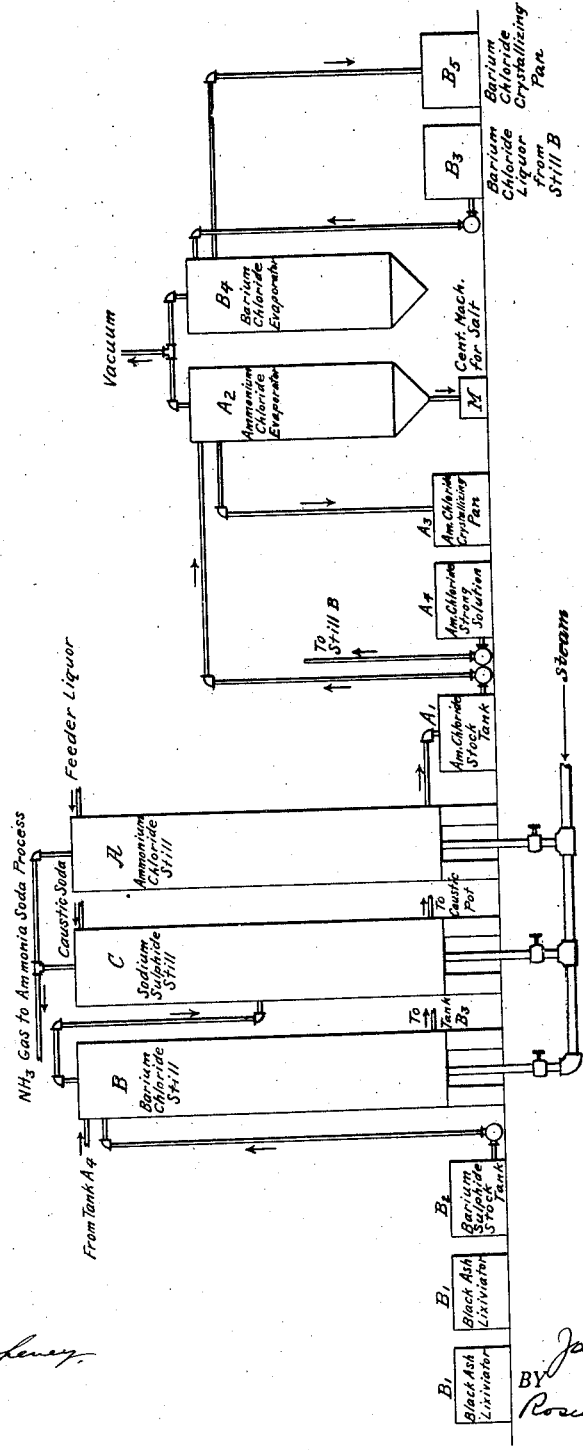
WITNESS:
INVENTOR.
James N. MacMahon
BY Rosenbaum, Stockbridge & Borst
ATTORNEYS.

UNITED STATES PATENT OFFICE.

JAMES H. MacMAHON, OF SALTVILLE, VIRGINIA, ASSIGNOR TO THE MATHIESON ALKALI WORKS, INC., A CORPORATION OF VIRGINIA.

METHOD FOR THE PRODUCTION OF BARIUM CHLORID.

1,378,594.   Specification of Letters Patent.   Patented May 17, 1921.

Application filed January 20, 1920. Serial No. 352,860.

*To all whom it may concern:*

Be it known that I, JAMES H. MacMAHON, a citizen of the United States, residing at Saltville, in the county of Smyth and State of Virginia, have invented certain new and useful Improvements in Methods for the Production of Barium Chlorid, of which the following is a full, clear, and exact description.

In accordance with this invention barium chlorid, which is so largely used in the production of other barium salts, may be abundantly produced at relatively small cost. Heretofore a common method of preparing barium chlorid has been to dissolve barium carbonate in hydrochloric acid. I have discovered a method of producing it from the black ash obtained by reducing the mineral barytes or barium sulfate with coal dust, as by calcining in a suitable furnace. This black ash which contains from sixty to seventy-five per cent. of barium sulfid may be inexpensively obtained in large quantities and it is therefore an abundant and cheap source of barium sulfid which is obtained from the black ash by lixiviation. By my method I convert this cheap barium compound at comparatively little cost into the valuable product, barium chlorid.

I have discovered that when barium sulfid and ammonium chlorid are mixed together in solution a chemical reaction takes place, barium chlorid and ammonium sulfid being formed in accordance with the following reaction:

$$BaS + 2NH_4Cl = BaCl_2 + (NH_4)_2S.$$

If the temperature of the solution be sufficiently hot (80° or 90° C.) when the reaction takes place, the ammonium sulfid formed passes off as a gas, and the barium chlorid may be separated out of the blow-off liquor by crystallization.

The commercial value of this discovery is considerably enhanced by reason of the fact that large quantities of ammonium chlorid are available in the feeder liquor resulting from the ammonia soda process, the chlorin content of which has heretofore gone to waste in the form of calcium chlorid. My invention therefore has an especial utility in the treatment of this particular liquor, and will be explained by way of illustration when so employed, but it will be understood that my invention is broadly applicable to the treatment of any ammonium chlorid solution to utilize the chlorin therein to form barium chlorid.

In the accompanying drawing, I have shown a diagram of an apparatus including receptacles and connections, suitable for carrying out my invention in connection with the feeder liquor from the ammonia soda process.

The feeder liquor from the sodium bicarbonate filters which consists principally of ammonium chlorid together with some ammonium bicarbonate, enters the top section of the ammonium chlorid still A. In the passage of the liquor down the still the volatile ammonium bicarbonate is driven off by the exhaust steam which enters the bottom section of the still and is returned to the ammonia soda process. The liquor which now contains ammonium chlorid and sodium chlorid leaves the bottom of the still and is conducted into the tank $A_1$ from which it is pumped into the ammonium chlorid evaporator $A_2$. In this vessel the liquor is concentrated until substantially all of the sodium chlorid is thrown out of solution. The sodium chlorid is drawn from the bottom of the evaporator to the centrifugal machine M where it is washed and dried, the weak liquor from this machine going back to the ammonium chlorid evaporator $A_2$. The strong ammonium chlorid liquor overflows into the ammonium chlorid crystallizing pan $A_3$. The ammonium chlorid crystals are then taken from this pan and made into a strong solution in the vessel $A_4$.

The black ash or crude barium sulfid is leached in the black ash lixiviators $B_1$, the clear concentrated solution being stored in the stock tank $B_2$. The reaction between the barium sulfid and ammonium chlorid by which barium chlorid and ammonium sulfid are produced, is carried out in the barium chlorid still B. The barium sulfid and ammonium chlorid solutions are pumped from their respective tanks, $B_2$ and $A_4$, into the top section of the still. Exhaust steam enters the bottom of the still which heats the liquor passing down the still. The ammonium sulfid is thereby caused to pass off as a gas from the liquor, and may be treated to recover the free ammonia therefrom.

For example, the ammonium sulfid gas may be conducted to the middle section of the sodium sulfid still C, where the ammonium sulfid gas may be absorbed in a caustic soda solution, sodium sulfid and free ammonia being formed. In that case the free ammonia will be driven from the liquor by the steam which enters the bottom section of the still and be returned to the ammonia soda process, the sodium sulfid liquor discharging from the bottom of the still into caustic pots where it will be evaporated until it contains about 60% of sodium sulfid.

The barium chlorid solution with a small quantity of ammonium chlorid in excess, to insure the complete decomposition of the barium sulfid, is run from the bottom section of still B to the barium chlorid tank $B_3$. From this tank it is pumped to the barium chlorid evaporator $B_4$, where it is concentrated by steam, the strong liquor overflowing to the crystallizing pan $B_5$. The mother liquor from this pan is returned again to the process, the barium chlorid crystals being washed and dried.

In some cases it may be preferable to treat the feeder liquor direct from the sodium bicarbonate filters without first separating the sodium chlorid, and separate the barium chlorid from the sodium chlorid, by crystallization, although generally the difficulty of separating the barium chlorid and sodium chlorid makes it preferable to first separate the sodium chlorid from the ammonium chlorid liquor before reaction with the barium sulfid.

The reaction between the barium sulfid and the ammonium chlorid is quantitative. Owing to the practical difficulty of exactly balancing the reagents, one or the other of the reacting substances will nearly always be in excess, and it is usually preferable that the ammonium chlorid should be in excess, as above mentioned. However, it will be understood that the barium sulfid may be used in excess, in which case the blow-off liquor may be treated with hydrochlorid acid to complete the decomposition of the barium sulfid.

I claim:

1. The method of producing barium chlorid consisting in separating the ammonium chlorid from the feeder liquor of the ammonia soda process, dissolving the ammonium chlorid crystals so obtained, mixing a solution of barium sulfid with the ammonium chlorid solution, forming barium chlorid and ammonium sulfid, and then separating the barium chlorid from the liquor by crystallization.

2. The method of producing barium chlorid consisting in concentrating the feeder liquor of the ammonia soda process by evaporation until substantially all the sodium chlorid is thrown out of solution, drawing off the sodium chlorid, separating the ammonium chlorid from the strong ammonium chlorid liquor by crystallization, dissolving the ammonium chlorid crystals so obtained, mixing a solution of barium chlorid with the ammonium chlorid solution, forming barium chlorid and ammonium sulfid, and then separating the barium chlorid from the liquor by crystallization.

3. The method of producing barium chlorid consisting in lixiviating the black ash of barytes to form a concentrated solution of barium sulfid, separating the ammonium chlorid from the feeder liquor of the ammonia soda process, dissolving the ammonium chlorid crystals so obtained, mixing the solution of barium sulfid with the ammonium chlorid solution, forming barium chlorid and ammonium sulfid, and then separating the barium chlorid from the liquor by crystallization.

4. The method of producing barium chlorid consisting in lixivating the black ash of barytes to form a concentrated solution of barium sulfid, concentrating the feeder liquor of the ammonia soda process by evaporation until substantially all the sodium chlorid is thrown out of solution, drawing off the sodium chlorid, separating the ammonium chlorid from the strong ammonium chlorid liquor by crystallization, dissolving the ammonium chlorid crystals so obtained, mixing the solution of barium sulfid with the ammonium chlorid solution, forming barium chlorid and ammonium sulfid, heating sufficiently to drive off the ammonium sulfid, and then separating the barium chlorid from the liquor by crystallization.

5. The method of making barium chlorid consisting in concentrating the feeder liquor of the ammonia soda process until the major portion of the contained sodium chlorid is thrown out of solution, removing the sodium chlorid thus thrown out, then reacting upon the feeder liquor with barium sulfid to produce barium chlorid and ammonium sulfid, and separating the barium chlorid and ammonium sulfid.

6. The method of making barium chlorid consisting in treating the feeder liquor of the ammonia soda process to remove the major portion of the contained sodium chlorid, then reacting upon the feeder liquor with barium sulfid in the presence of sufficient heat to produce barium chlorid in solution and ammonium sulfid in the vapor phase.

7. The method of making barium chlorid consisting in concentrating the feeder liquor of the ammonia soda process to throw out of solution the major portion of the sodium chlorid content, removing the sodium chlorid from the feeder liquor, then reacting upon the liquor with barium sulfid with the feeder liquor sufficiently in excess to insure the complete decomposition of the barium sulfid and producing barium chlorid and ammonium sulfid, and then isolating the barium chlorid.

8. The method of making barium chlorid consisting in treating the feeder liquor of the ammonium soda process to remove the major portion of the contained sodium chlorid, then reacting upon the feeder liquor with barium sulfid to produce barium chlorid and ammonium sulfid, the feeder liquor in the last reaction being slightly in excess of the amount necessary to combine with the barium sulfid in order to insure the complete decomposition of the barium sulfid and then separating the barium chlorid from the resultant liquor.

In witness whereof I hereunto subscribe my signature.

JAMES H. MacMAHON.